United States Patent [19]

Duranel et al.

[11] Patent Number: 5,188,999
[45] Date of Patent: Feb. 23, 1993

[54] CATALYST SUPPORT FOR POLYMERIZATION OF OLEFINS, PROCESS FOR MANUFACTURING THE SAME, AND CATALYST OBTAINED FROM THIS SUPPORT

[75] Inventors: Laurent Duranel, Pau; Jean Malinge, Orthez; Marie-Laure Bousque, Pau, all of France

[73] Assignee: Atochem, France

[21] Appl. No.: 613,620

[22] Filed: Nov. 14, 1990

[30] Foreign Application Priority Data

Nov. 16, 1989 [FR] France .................. 89 15028

[51] Int. Cl.$^5$ ................................................ C08F 4/02
[52] U.S. Cl. ................................ 502/111; 502/119; 502/125; 502/134; 502/169
[58] Field of Search .............. 502/111, 119, 125, 134, 502/169

[56] References Cited

U.S. PATENT DOCUMENTS

| | | | |
|---|---|---|---|
| 4,315,874 | 2/1982 | Ushida et al. | 502/134 |
| 4,481,342 | 11/1984 | Invernizzi et al. | 502/125 |
| 4,551,439 | 11/1985 | Harada et al. | 502/107 |

Primary Examiner—Patrick P. Garvin
Assistant Examiner—Brent M. Peebles

[57] ABSTRACT

A catalyst support in the form of solid particles consisting essentially of a complex of $MgCl_2$ and alcohol of the formula $MgCl_2, x(n\text{-}BuOH)$ in which $0.1 \leq x \leq 2$, and which has a specific surface of 1 to 20 $m^2/g$ and a particle porosity of 1 to 2 $cm^3/g$, and the process of making such support, and catalytic components comprising such support, a transition metal, and optionally, an electron donor.

13 Claims, No Drawings

CATALYST SUPPORT FOR POLYMERIZATION OF OLEFINS, PROCESS FOR MANUFACTURING THE SAME, AND CATALYST OBTAINED FROM THIS SUPPORT

BACKGROUND OF THE INVENTION

The present invention relates to a catalyst support constituted essentially of a complex of magnesium chloride and n-butanol (n-BuOH). This complex is formed of particles with a high porous volume and has a low specific surface. It is prepared by precipitation of $MgCl_2$ in solution in n-butanol at a temperature below the melting point of the complex from an emulsion of the said solution.

A catalyst for the polymerization of olefins can be obtained from the support by deposition under known conditions of a transition metal compound as well as other possible compounds which are customary with this type of catalyst.

According to British Patent No. 2,029,840 it is known to mix magnesium chloride, an alcohol or a phenol and a mineral oil and to form an emulsion of the system at a temperature of circa 120° C. so as to maintain the magnesium chloride-alcohol or phenol complex in the molten state. After tempering the hot emulsion in a very cold nonsolvent of the complex, one recovers a product with a specific surface of 300 to 500 m$^2$/g, the particle porosity of which is between 0.3 and 0.4 cm$^3$/g.

It is also known from U.S. Pat. No. 4,499,194 to manufacture a support constituted of a complex of magnesium chloride and alcohol or phenol. According to this patent, magnesium chloride is made to react with an alcohol or a phenol in an inert organic solvent so as to form a complex, the system is then maintained in suspension in an inert organic solvent at a temperature between 85° and 170° C. so as to maintain the complex in the molten state. From this hot suspension are precipitated, by means of an organo-aluminic compound or a silicon halide, particles that have a specific surface between 200 and 700 m$^2$/g and a porosity between 0.2 and 0.7 cm$^3$/g.

SUMMARY OF THE INVENTION

In accordance with the procedure of the present invention, it is possible to obtain a support in the form of solid particles constituted essentially of a complex with the formula $MgCl_2$, x(n-BuOH) in which $0.1 \leq x \leq 2$ and the specific surface of which is between 1 and 20 m$^2$/g and the particle porosity of which is between 1 and 2 cm$^3$/g. The support is formed of solid particles an average dimension between 10 and 100 μm and the granulometric distribution range of which, defined by the ratio $D_{90}:D_{10}$, is equal to or lower than 7. $D_{90}$ and $D_{10}$ are the diameter dimensions below which are 90% and 10% by weight of the particles, respectively.

In the support obtained the Cl:Mg mass ratio is usually from 2.65 to 2.96 and the n-BuOH:Mg mass ratio is usually from 0.4 to 6.

DETAILED DESCRIPTION

The process for manufacturing the support from $MgCl_2$ and n-butanol is characterized in that a solution of $MgCl_2$ in an excess of n-butanol put into emulsion in an emulsifying medium is treated with a precipitating agent of formula $SiCl_xR_{4-x}$, in which $1 \leq x \leq 4$. The complex formed, $MgCl_2$, x(n-BuOH) in which $0.1 \leq x \leq 2$ is in the emulsion and is precipitated at a temperature no higher than 50° C.

So as to facilitate the putting of $MgCl_2$ into solution in the n-butanol, it is recommended to first disperse the $MgCl_2$ in an organic liquid which is a nonsolvent of $MgCl_2$ and is chemically inert in relation to $MgCl_2$ and n-butanol, and to mix the n-butanol with the dispersion. The liquid for dispersing the $MgCl_2$ must have a boiling point preferably equal to or lower than 100° C.; the liquid is usually selected from among the light hydrocarbons such as hexane.

In order to put the $MgCl_2$ into solution in n-butanol, the n-butanol:$MgCl_2$ molar ratio is generally at least 9 so as to facilitate putting the $MgCl_2$ into solution in n-butanol and/or the handling of this solution at a temperature below 50° C. Although a higher molar ratio is not limitative, it is recommended, for reasons of economy and in order to limit the product volumes to be handled, not to exceed a molar ratio of n-butanol to $MgCl_2$ of 15. A clear, perfectly stable solution of $MgCl_2$ in n-butanol at a temperature not exceeding 50° C. is obtained with a molar concentration of 10 n-butanol per 1 $MgCl_2$. Also, the best conditions for putting $MgCl_2$ into solution in n-butanol involve employment, for putting the $MgCl_2$ into solution, of a n-butanol:$MgCl_2$ molar ratio between 9.5 and 10.5.

The $MgCl_2$ is put into solution, preferably while stirring, in n-butanol at a temperature between 20° and 110° C., and preferably between 50° and 100° C. When the $MgCl_2$ is first dispersed in a liquid dispersant as previously stated, the mixture, after addition of the n-butanol, is maintained for a sufficient period of time and at a sufficient temperature between 20° and 110° C., and preferably between 50° and 100° C., so as, on the one hand, facilitate the putting of the $MgCl_2$ into solution in n-butanol and, on the other hand, to eliminate the liquid employed for the dispersion. After this treatment, the liquid obtained after cooling remains clear and stable at a temperature no higher than 50° C.

The solution of $MgCl_2$ in n-butanol, after elimination of the possible liquid dispersant, is put into emulsion in an emulsifying medium which is an organic liquid that is nonsolvent and inert in relation to the solution, in the presence of a nonionic surface-active agent at a temperature which can range from room temperature to 50° C. The organic liquid emulsifier is preferably selected from among the heavy hydrocarbons, such as the paraffin oils, with a viscosity at 20° C. between 0.1 and 1 Pa.s. In the emulsion, the volume ratio of the emulsifier medium to the butanolic phase represented by the solution of $MgCl_2$ in n-butanol is usually between 1 and 5, preferably between 2 and 3.

The well known purpose of the nonionic surface-active agent is to facilitate maintenance in dispersed form in the emulsifying medium of the droplets formed by emulsion, in the specific case of butanolic solution of $MgCl_2$. This surface-active agent is preferably selected from among those with a hydrophilic-lipophilic balance (HLB) between 0 and 9, preferably between 1 and 4. This HLB, defined by GRIFFIN in 1940, is characteristic of each surface-active agent. It is established on an arbitrary scale of 0 to 20 with the lipophilic products having an HLB between 0 and 9 and the hydrophilic products having an HLB between 11 and 20. These surface-active agents can be, for example, the fatty acid esters of sorbitan or glycerin such as sorbitan trioleate or glycerin mono and dioleate, or polyoxyethylene fatty acid esters. The amount of surface-active agent added is on the order of 1 to 5% by weight, preferably between 2 and 3%, in relation to the ensemble of the dispersant medium and butanolic solution of $MgCl_2$.

As known by those skilled in this field, the stirring must be sufficient to maintain the alcoholic phase in the form of droplets in the emulsifying medium. If this criterion is respected, the stirring conditions do not appear to be critical, particularly for a better stability of the emulsion at the temperatures of the procedure than at higher temperatures.

To this emulsion is added the precipitating agent which is a chlorinated derivative of silicon with the formula $SiCl_xR_{4-x}$, in which $1 \leq x \leq 4$ and R is a saturated hydrocarbon radical containing from 1 to 4 carbon atoms. It is preferably added to the emulsion while stirring and sufficiently slowly so as to control the formation of HCl and govern the reaction. Although the chlorinated silicon derivative can be added in pure form to the emulsion, it is usually added diluted in an inert solvent such as a hydrocarbon. The temperature of the emulsion is obviously maintained in the range between room temperature and 50° C. during precipitation of the $MgCl_2$, x(n-BuOH) complex; this temperature range facilitates control of the morphology and physical characteristics of the final support.

The precipitated support can be recovered in a conventional manner after filtration, washing with an inert organic liquid, such as a light hydrocarbon, and drying.

It can be recommended that the support be subjected to a second treatment with the aforementioned chlorinated silicon derivative. In this case, the support, as previously precipitated and isolated after possible washing and even drying, is put again into suspension in an organic nonsolvent liquid such as a hydrocarbon and treated a second time with the chlorinated silicon derivative under conditions similar to those described for the first treatment.

Irrespective of whether the treatment of the solution of $MgCl_2$ in n-butanol with the chlorinated silicon compound is carried out once or twice, the total amount of the chlorinated silicon compound employed is generally such that the molar ratio of the Cl of the chlorinated silicon compound to the n-butanol is between 1 and 8, preferably between 2 and 4.

A catalytic component can be obtained by combination of the support in accordance with the invention and a transition metal compound. Thus, for example, such a component can be obtained by impregnation of the support by a preferably halogenated titanium compound. This catalytic component combined with a cocatalyst selected from among the organometallic compounds of metals of Group I to II of the Periodic Table, and more specifically, the compounds of aluminum, acts as a catalyst of polymerization or copolymerization of linear or branched olefins such as ethylene, propylene, 1-butene, 1-octene, 4-methyl-1-pentene, 1-3-butadiene.

At least one electron donor can be added during the manufacture of the catalytic component and/or the cocatalyst. The electron donors can be selected, for example, from among Lewis bases, esters of oxygen acids, ketones, aldehydes, ethers, amides and phosphorus compounds such as phosphines and phosporamides; preferred are the alkyl esters of aromatic acids or the alkyl mono or diethers.

The catalyst obtained from a component manufactured from the support is suitable for all types of polymerization of olefins: under high or low pressure, in suspension or in gas phase.

The following examples illustrate the invention without, however, limiting it. The granulometries, mean diameter $D_{50}$ and granulometric distribution range defined by $D_{90}:D_{10}$ were determined with a MALVERN 1600 laser granulometer. The specific surface was measured by isothermal physical adsorption of nitrogen at the temperature of liquid nitrogen, BET method, on a QUANTASORB instrument from the QUANTACHROME firm. The porous volume was determined by mercury adsorption under pressure with an ERBA-SCIENCE 1500 porosimeter.

EXAMPLE 1

Into a 2-L reactor are introduced successively, under an inert atmosphere and while stirring, 450 mL of dry hexane and then 150 g of anhydrous $MgCl_2$. One then adds 1440 mL of anhydrous n-butanol to this suspension. The hexane is distilled by heating at 60° C. for 1 hour under a nitrogen stream. The $MgCl_2$ dissolves during this stage. After returning to room temperature, the homogeneous solution had the following characteristics: %Mg=3.02, %Cl=8.9, n-BuOH=88 (% by weight), $d_{20°C.}=0.95$ g/cm3.

Into a 2-L reactor equipped with mechanical agitation, under an inert atmosphere, are introduced successively 500 mL of a paraffin oil with a viscosity at 20° C. equal to 0.2 Pa.s, 16 g of sorbitan trioleate and 200 mL of the previously prepared $MgCl_2$, 10 n-BuOH solution. After stirring for 30 minutes at 1000 rpm, one obtains a whitish emulsion which is stable under agitation.

Into this solution at 35° C., one adds slowly over 45 minutes 225 mL of 5M $SiCl_4$ solution in hexane. The mixture is then kept at 50° C. for one hour. After cooling, the precipitated solid is filtered and washed three times with 300 mL of dry hexane and then dried under nitrogen.

The isolated support is granular and has the following characteristics: Cl : Mg=2.7, n-BuOH : Mg=1.55, surfaces=$2m^2/g$, porous volume= 1.06 $cm^3/g$, mean diameter $D_{50}=43$ μm, $D_{90}:D_{10}=5.2$.

EXAMPLE 2

To the same amount of emulsion, at a temperature of 35° C., prepared in accordance with Example 1, are added over 40 minutes 130 mL of 5M $SiCl_4$ solution in hexane. The mixture is then kept at 50° C. for one hour. The precipitated solid is filtered and then put again into suspension in hexane. One then adds 130 mL of 5M $SiCl_4$ solution and the mixture is again kept at 50° C. for one hour under light stirring. The solid is isolated as in Example 1.

The support has the following characteristics: Cl : Mg=2.93, n-BuOH=2.1, surface=16.7 $m^2/g$, porous volume=1.79 $cm^3/g$, $D_{50}=91$ μm, $D_{90}:D_{10}=5.7$.

EXAMPLE 3

Into a reactor under nitrogen, one puts 40 mL of dry heptane and 7.5 g of the support of Example 1; one then adds while stirring 28 mL of $TiCl_4$. The mixture is brought to 90° C. for two hours, filtered and washed with hexane at 50° C. The catalytic component obtained contains 6.1% by weight of Ti.

Into a 2.5-L reactor, one introduces in order at ambient temperature under an inert atmosphere 1.5 L of hexane, 5 mM of triisobutylaluminum and 13.5 mg of the aforementioned catalytic component. Hydrogen is added until reaching a partial pressure of 4.2 bars and then made up with ethylene, adjusting the pressure to reach 11 bars absolute of total pressure after heating to 80° C. This total pressure is kept constant for 3 hours by addition of ethylene. At the end of 3 hours, injection of ethylene is stopped and cooling to room temperature is carried out; the catalyst is deactivated by addition of an acid solution of 10% methanol. After filtration and drying, one isolates 550 g of polyethylene with a fluidity index (Melt Index) under 2 kg at 190° C. in 10 minutes $MI_2 = 0.98$, i.e., a productivity of 40,700 g of PE per g of catalyst.

EXAMPLE 4

Into a reactor under nitrogen while stirring one adds to 56 g of the support of Example 2,200 mL of $TiCl_4$ in 1000 mL of heptane. The mixture is brought to 90° C. for 2 hours, filtered and washed with hexane at 50° C. The catalytic component obtained contains 8.4% by weight of Ti.

One uses 5 mg of the catalytic component in polymerization of ethylene under the same conditions as in Example 3. The amount of polymer produced is 610 g of polyethylene with $MI_2 = 0.7$, i.e., a productivity of 120,000 g of PE per g of catalyst.

EXAMPLE 5

Into a reactor under nitrogen one puts 5 g of the support of Example 2 in dry heptane. One adds 2.5 mM of triethylaluminum and brings the mixture to 50° C. for one hour. After washing with heptane,; the solid thereby obtained is taken up in 50 mL of a solution in heptane of dioctylphthalate at 0.3 mole per liter for two hours at 90° C. After filtration and washing with heptane, the solid is treated twice with a 1 M/L solution of $TiC1_4$ in 1-2-dichloroethane for 2 hours at 80° C. After washing and drying, one obtains a solid catalytic component containing 4.7% by weight of titanium.

Into a stainless steel autoclave reactor equipped with magnetic agitation and double-jacket heating, one introduces successively 1.5 liters of liquid propylene, 4.5 mM of triethylaluminum and 0.45 mM of phenyltriethoxysilane, and 15 mg of catalytic component.

The temperature is brought to 70° C. for 1 hour. One recovers 169.5 of polypropylene of which 7.9 g of polymer soluble in boiling heptane. The catalytic activity is 240,000 g of polymer per g of Ti per hour. The polymer has good flowability and a narrow granulometric distribution. The polymer has a fluidity index measured at 230° C. under 2.16 kg of 3 g in 10 minutes.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A catalyst support in the form of solid particles consisting essentially of a complex of $MgCl_2$ and alcohol of the formula $MgCl_2$, x (n-BuOH) in which $0.1 \leq x \leq 2$, and which has a specific surface of 1 to 20 $m^2/g$ and a particle porosity of 1 to 2 $cm^3/g$.

2. The support of claim 1, wherein the range of granulometric distribution defined by the ratio $D_{90} : D_{10}$ is such that $D_{90} : D_{10} \leq 7$.

3. A process for manufacturing the catalyst support of claim 1 comprising contacting $MgCl_2$ and n-butanol such that a solution of $MgCl_2$ in an excess of n-butanol is put into emulsion in an emulsifying medium and treated with a precipitating agent which has the formula $SiCl_xR_{4-x}$, in which $1 \leq x \leq 4$ and R is a hydrocarbon radical containing from 1 to 4 carbon atoms, the complex formed is in the emulsion, and the complex is precipitated from the emulsion at a temperature no higher than 50° C.

4. The process of claim 3, wherein the n-butanol : $MgCl_2$ molar ratio in the solution is at least 9.

5. The process of claim 3, wherein prior to being put into solution in n-butanol, the $MgCl_2$ is dispersed in an organic liquid which is a non-solvent of $MgCl_2$ and chemically inert in relation to $MgCl_2$ and n-butanol.

6. The process of claim 5, wherein the organic liquid dispersant has a boiling point equal to or lower than 100° C.

7. The process of claim 6, wherein the organic liquid dispersant is a hydrocarbon.

8. The process of claim 7, wherein the organic liquid dispersant is eliminated from the solution of $MgCl_2$ in n-butanol prior to putting the said solution into emulsion.

9. The process of claim 8, wherein the emulsifying medium is a hydrocarbon which has a viscosity at 20° C. between 0.1 and 1 Pa.s.

10. The process of claim 9, wherein the volume ratio of the emulsifying medium to the solution of $MgCl_2$ in n-butanol is between 1 and 5.

11. The process of any one of claims 3 to 10, wherein the total amount of chlorinated silicon compound employed is such that the molar ratio of the Cl from the chlorinated silicon compound to the n-butanol is between 1 and 8.

12. A catalytic component which can be employed in the polymerization or copolymerization of olefins comprising a transition metal and the support of claim 1 or 2.

13. The catalytic component of claim 12 also including an electron donor.

* * * * *

UNITED STATES PATENT AND TRADEMARK OFFICE
CERTIFICATE OF CORRECTION

PATENT NO. : 5,188,999
DATED : February 23, 1993
INVENTOR(S) : Duranel et al

It is certified that error appears in the above-indentified patent and that said Letters Patent is hereby corrected as shown below:

Col. 3, line 53, correct "II" to read -- III --;
       line 57, after "pentene," insert
-- 1-hexene, --.

Signed and Sealed this

Fourteenth Day of December, 1993

Attest:

BRUCE LEHMAN

*Attesting Officer*    *Commissioner of Patents and Trademarks*